(12) United States Patent
Hohne et al.

(10) Patent No.: US 7,437,028 B2
(45) Date of Patent: Oct. 14, 2008

(54) MULTI-LAYERED SENSOR

(75) Inventors: Michael Hohne, Ebersbach (DE);
Christopher Castleton, Plochingen (DE); Joachim Flaig, Kongen (DE);
Markus Schafer, Rudersberg (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 10/533,165

(22) PCT Filed: Oct. 29, 2003

(86) PCT No.: PCT/EP03/12020

§ 371 (c)(1),
(2), (4) Date: Apr. 29, 2005

(87) PCT Pub. No.: WO2004/040250

PCT Pub. Date: May 13, 2004

(65) Prior Publication Data

US 2006/0008197 A1   Jan. 12, 2006

(30) Foreign Application Priority Data

Oct. 29, 2002   (DE) ............... 102 51 085

(51) Int. Cl.
*G02B 6/00* (2006.01)
*G01J 1/04* (2006.01)
*G01L 1/24* (2006.01)

(52) U.S. Cl. ............ 385/13; 385/12; 250/227.14; 250/227.18

(58) Field of Classification Search ............... 385/12, 385/13
See application file for complete search history.

(56) References Cited

U.S. PATENT DOCUMENTS

| 4,725,124 A * | 2/1988 | Taylor ............ 385/4 |
| 5,193,129 A | 3/1993 | Kramer |
| 5,357,813 A * | 10/1994 | Weinberger ........ 73/865.7 |
| 5,604,318 A | 2/1997 | Fasshauer |
| 5,913,245 A | 6/1999 | Grossman |
| 6,429,421 B1 * | 8/2002 | Meller et al. ........ 250/227.14 |
| 2003/0209655 A1 * | 11/2003 | Wang ........ 250/227.14 |

FOREIGN PATENT DOCUMENTS

| DE | 37 01 632 | 1/1987 |
| EP | 0 539 275 | 1/1996 |
| WO | WO 02/46712 | 6/2002 |

* cited by examiner

*Primary Examiner*—Tina M Wong
(74) *Attorney, Agent, or Firm*—Clark Hill PLC

(57) ABSTRACT

A multi-layer sensor (10) and a use for the sensor (10) are described. This sensor is multi-layered in construction. 5 An optical wave guide (18) is passed through the sensor (10) such that in the event of an external application of force the force acts on the optical wave guide.

6 Claims, 3 Drawing Sheets

MULTI-LAYERED SENSOR

FIELD OF THE INVENTION

The invention relates to a multi-layer sensor and the use of the multi-layer sensor as a pressure sensor and/or force sensor in a motor vehicle.

BACKGROUND TO THE INVENTION

Within the scope of the introduction of new legislation to protect pedestrians, various active measures are planned for meeting the requirements. To this end, force and/or pressure sensors will increasingly be installed in motor vehicles in the next few years; in the event of an impact or collision these sensors will detect what type of object the vehicle has hit. Thus, for example, it will be possible to distinguish whether the vehicle has hit a tree, another vehicle or a pedestrian. In order to implement effective protection for pedestrians, if a collision with a pedestrian is detected a suitable reaction will then occur, i.e. suitable measures will be triggered such as, for example, the deploying of airbags or the deformation of the bonnet.

The sensors used for this purpose thus have to deliver a signal extremely quickly to allow reliable identification.

The printed specification DE 195 34 260 C2 discloses a fiber-optic load sensor in the form of a cable in which the load acts on an optical fiber arrangement. The optical fiber arrangement comprises two optical fibers which are both wound in the same direction around a plastic core.

SUMMARY OF THE INVENTION

An optical wave guide is passed through the multi-layer sensor according to the invention, this wave guide being arranged so that in the event of an external application of force the force acts on the optical wave guide.

Provision may be made for the optical wave guide to be bent by the external application of force or for the optical wave guide to be deformed by the application of force, changing its cross section. In both cases the amount of light passed through the optical wave guide varies, so that it is possible to detect the application of force, e.g. as a result of an impact.

According to one feature of the sensor according to the invention it has a structure with a front layer and a back layer in which the optical wave guide is arranged. In this embodiment the layers, which are preferably made of a hard but flexible material, act directly on the optical wave guide and cause it to be bent in a typical manner in the event of an external application of force. Suitable materials for the layer include thermoplastic polyurethane or thermoplastic polyester elastomer. These materials exhibit virtually constant properties over a wide range of temperatures.

The structure, i.e. the front and back layers, may have certain attachments or geometric formations, e.g. clips and/or ribs, which serve to hold the optical wave guide. These also ensure that the bending of the optical wave guide takes place in a precisely defined manner as a result of an external application of force. In this embodiment it is also guaranteed that the sensor remains flexible without its operational abilities being impaired by the application of force.

In the embodiment described the structure is directly in contact with the optical wave guide, so that any external force acting on the structure is transmitted directly to the optical wave guide.

According to one feature, there is an adhesive layer between the front layer and the back layer, holding the two layers together, this adhesive layer preferably only being applied in the region of the edges of the two layers so that the optical wave guide is not affected by the layer of adhesive. However, the layer may also be formed over the entire surface. This layer protects the sensor and particularly the optical wave guide from soiling and moisture.

It should be noted that the material properties of the adhesive layer affect the behavior of the sensor. The behavior of the sensor, i.e. its sensitivity, can be precisely adjusted by a suitable choice of materials both for the structure and for the adhesive layer and optical wave guide. The degree of relative movement between the two layers under the application of a specific force can be adjusted by means of parameters such as hardness, the width of the adhesive layer, the number of adhesive layers, etc.

In another embodiment the sensor according to the invention comprises a first layer through which an optical wave guide is passed, and a second layer which abuts on the first layer. In that case, the first layer has greater compressibility than the second layer.

The second layer, which is harder than the first layer, thus absorbs the impulse or pressure caused by the impact and transmits it substantially without losses to the first layer. This first softer layer deforms and therefore also deforms the optical wave guide contained therein. The first layer therefore consists of a material which imparts a higher compressibility to it than the material used in the second layer. However, it is also possible to provide for direct contact between the optical wave guide and at least one of the outer hard layers and thus ensure that impact causes the optical wave guide to bend.

As a result of the mechanical deformation of the optical wave guide during a collision the quantity of light passing through the optical wave guide is altered. For each type of impact (pedestrian, dustbin, small animal, etc) there is a specific signal for the impact. This signal then optionally triggers a subsequent active measure. As a result of the impact the quantity of light and the resulting voltage are thus altered.

Preferably a third layer is provided which has less compressibility than the first layer and which is arranged such that the first layer is disposed between the second and third layers.

The layers are preferably made of plastic materials, e.g. polyurethane (PUR).

It is advantageous if the layers are made of flexible materials as in this case the sensor can be adapted to fit different shapes of surface by bending and can thus be mounted anywhere without interfering with the operational qualities.

According to one feature of the sensor according to the invention the optical wave guide is passed twice through the first layer. It is also advantageous if the optical wave guide is passed through the first layer in a wave-like or rippled configuration.

Preferably, the first layer consists of a cast composition.

The use according to the invention envisages using a sensor as described above as a pressure sensor and/or force sensor in a motor vehicle for the purposes of pedestrian protection.

Further features and advantages of the invention will become apparent from the specification and the appended drawings.

It will be understood that the features mentioned above and those to be described hereinafter can be used not only in the combination specified but in other combinations or on their own, without departing from the scope of the present invention.

BRIEF DESCRIPTION OF THE INVENTION

The invention is diagrammatically illustrated in the drawings by means of exemplifying embodiments and is hereinafter described in detail with reference to the drawings.

Figure 6:
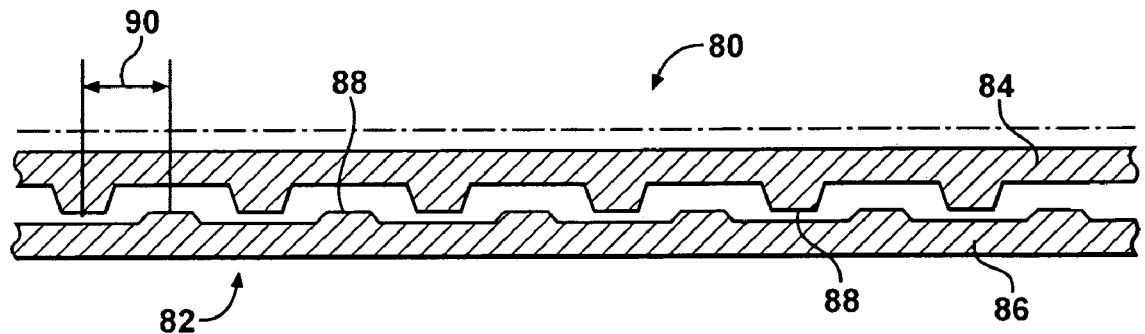

FIG. 6 diagrammatically shows a highly simplified view of a sensor according to the invention.

Figure 7:
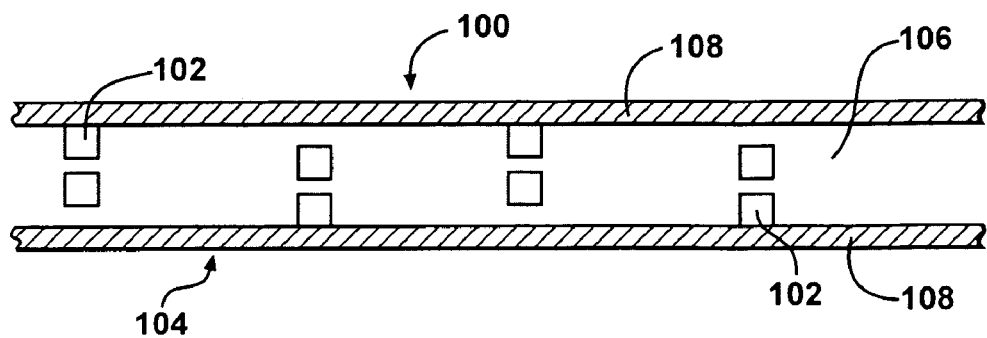

FIG. 7 is a plan view of a sensor according to the invention.

DETAILED DESCRIPTION OF THE PREFERRED EMBODIMENT

Figure 1:
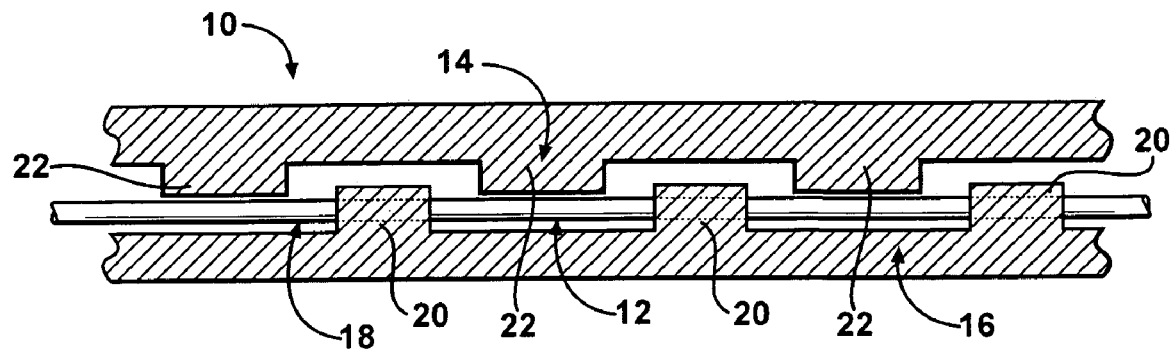
FIG. 1 shows a preferred embodiment of the sensor according to the invention in side view.

FIG. 1 shows in side view a multi-layer sensor according to the invention, generally designated 10. This sensor may be used in a motor vehicle for the purposes of pedestrian protection.

The drawing shows a first layer 12 consisting in this instance of a cast composition, a second layer 14 which is also referred to as the front failure structure, and a third layer 16 which is referred to as the rear failure structure.

An optical wave guide 18 is passed through the first layer 12. It is guided by means of domes 20 formed on the third layer 16. Ribs 22 are formed on the second layer 14.

The second layer 14 and the third layer 16 may be produced by an injection molding process. What is important is that these two layers 14 and 16 have a lower compressibility than the first layer 12. In the event of impact the pressure exerted is transmitted through the second layer 14 or front failure structure to the first layer 12, which deforms itself and the optical wave guide contained therein.

Figure 2:
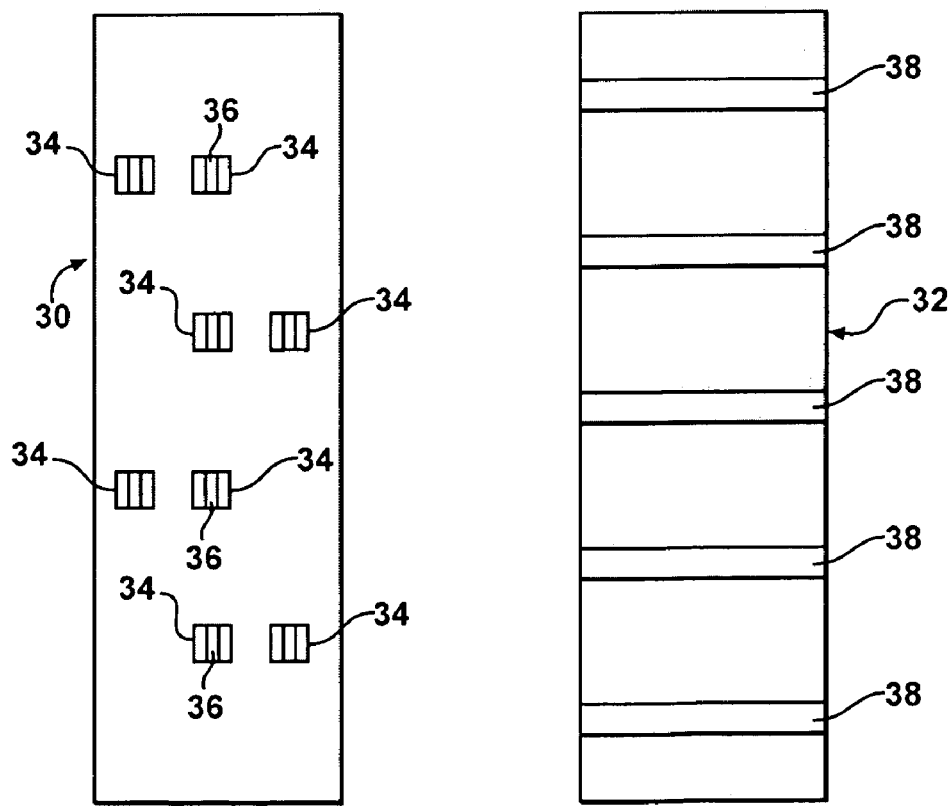
FIG. 2 shows embodiments of a second and third layer in plan view.

FIG. 2 shows a second layer 30 and a third layer 32 viewed from above. Molded-on domes 34 are visible in the third layer 30, the rear failure structure. Slots 36 are provided in these domes through which an optical wave guide can be passed.

It is evident that domes 34 are always arranged in pairs alongside each other and the pairs may be laterally offset from one another. Thus, the optical wave guide may be passed through the adjacent first layer twice and in a wave-like configuration. The domes 34 project into the first layer.

Moreover, molded-on ribs 38 are also visible in the second layer 32, the front failure structure.

Figure 3:
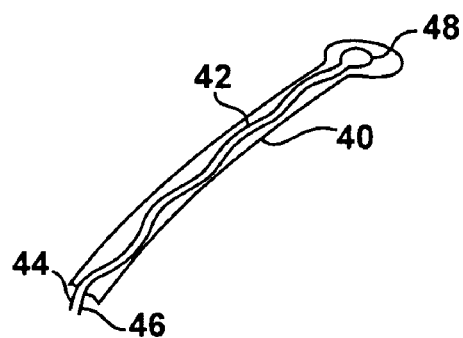
FIG. 3 shows, in simplified form, a third layer with an optical wave guide.

FIG. 3 shows, in simplified form, a third layer 40 with an optical wave guide 42. It is clear that the optical wave guide 42 is guided in a wave-shaped or rippled configuration. A light entry end 44 and a light exit end 46 are provided at the same end of the third layer 40. At the other end of the third layer 40 the optical wave guide 42 forms a loop 48, so that the optical wave guide 42 is passed twice over the third layer 40 and hence into the first layer.

In the sensor according to the invention the activation of the signal is independent of the position of impact and angle of impact over the entire width of the sensor. Moreover, the operation of the sensor is not affected by prevailing temperatures. As the optical wave guide is embedded in the first layer it is protected from environmental factors. A further advantage is that no corroding materials are used. A major advantage is that the sensor can be used on any type of vehicle.

Figure 4:
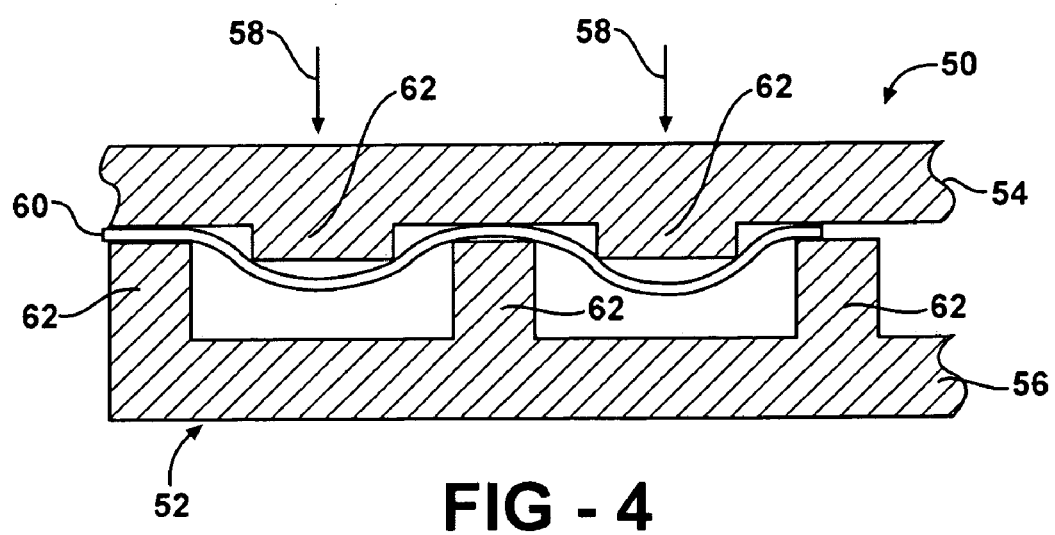
FIG. 4 shows in side view another embodiment of the sensor according to the invention.

FIG. 4 shows another embodiment of the sensor according to the invention, generally designated 50. A structure 52 is shown, having a front layer 54 and a rear layer 56. Arrows 58 indicate the possible effects of pressure or force produced by an impact.

An optical wave guide 60 is passed through the structure 52, namely between the front layer 54 and the rear layer 56. The two layers 54 and 56 both have ribs 62 which are matched to one another such that in the event of an impact and a resulting relative movement between the two layers 54 and 56 the optical wave guide 60 is bent. This bending causes a change in the amount of light carried per unit of time through the optical wave guide 60.

Figure 5:
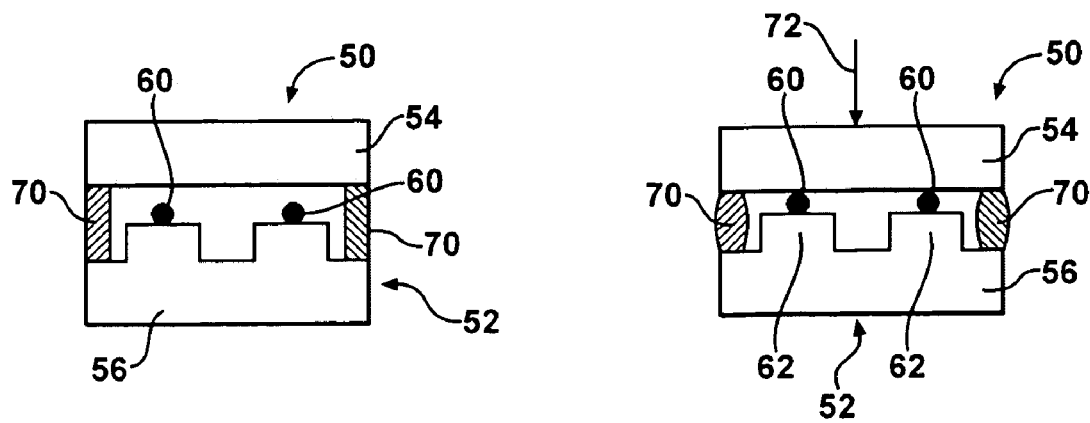
FIG. 5 illustrates the method of operation of the sensor in FIG. 4.

FIG. 5 illustrates the mode of operation of the sensor 50. This figure also shows an adhesive layer or bead 70 of adhesive which joins together with two layers 54 and 56 and protects the optical wave guide 60 guided within the structure 52 from environmental factors.

The figure shows how the bead of adhesive 70 is deformed as a result of the effect of force (Arrow 72) in the left hand drawing and thereby allows relative movement between the two layers 54 and 56. As at least one of the layers is in direct contact with the optical wave guide 60, optionally even before the impact, this wave guide is bent. It is thus possible for the direct contact between the structure 52 and the optical wave guide 60 to be present even before impact, or for this contact to be made as a result of the relative movement described above. In either case, the optical wave guide is bent, with the assistance of the shape of the structure and the configuration of the on-on ribs.

FIG. 6 shows another embodiment of the sensor according to the invention, generally designated 80.

The drawing also shows a structure 82 which comprises a front layer 84 and a rear layer 86. Between these layers 84 and 86 extends an optical wave guide (not shown). The corresponding arrangement of ribs 88 on the layers 84 and 86 is clearly visible. The distance between two ribs is preferably about 8.5 mm (Arrow 90).

FIG. 7 shows a sensor 100 according to the invention viewed from above. The drawing shows clips 102 which are arranged in pairs and allow the optical wave guide to be arranged in a wave-like configuration. These clips 102 secure the optical wave guide firmly in the sensor 100.

The sensor has a structure 104, only a front layer 106 of which is shown in this diagram. An adhesive layer 108 is applied in the region of the edges of the front layer 106, attaching the front layer 106 to the underlying rear layer which is not shown in this drawing. This adhesive layer 108 protects the sensor 100 or the optical wave guide contained therein from external factors. The material of the adhesive layer and the width of the layer affect the relative mobility of the two layers to one another and consequently the sensitivity of the sensor.

What we claim is:

1. A multi-layer sensor comprising:
   a first layer extending in a longitudinal direction and including a plurality of domes mounted therealong, each of said plurality of domes including a slot extending therethrough, said plurality of domes spaced apart from one another longitudinally and offset from one another in a lateral direction;
   an optical wave guide retained solely by said plurality of domes, said optical wave guide extending through said slots in said plurality of domes; and
   a second layer facing said first layer and selectively transmitting an external application of force to said optical wave guide, said second layer including ribs for deforming said optical wave guide towards said first layer in response to an impact in order to change the amount of light carried per unit of time through said optical wave guide.

2. A multi-layer sensor as set forth in claim 1 wherein said first and second layers are joined together by an adhesive layer.

3. A multi-layer sensor according to claim 2, wherein said adhesive layer is applied only in a region of edges of said first and second layers.

4. A multi-layer sensor according to claim 3, including a middle layer between said first and second layers through which said optical wave guide is passed, wherein said middle layer has a greater compressibility than said first and second layers.

5. A multi-layer sensor according to claim 1, wherein said optical wave guide is passed through said sensor at least twice.

6. A multi-layer sensor according to claim 5, wherein said optical wave guide is passed through said sensor in a wave-like configuration.

* * * * *